(12) United States Patent
Dayama et al.

(10) Patent No.: US 10,469,649 B2
(45) Date of Patent: Nov. 5, 2019

(54) ELECTRONIC DEVICE AND METHOD FOR CONTROLLING THE SAME

(71) Applicant: SAMSUNG ELECTRONICS CO., LTD., Suwon-si, Gyeonggi-do (KR)

(72) Inventors: Dwarkaprasad Omprakash Dayama, Seoul (KR); Madan Kanth Lanka, Seoul (KR); Ashok Babu Channa, Suwon-si (KR); Naga Ashok Babu Jampani, Suwon-si (KR)

(73) Assignee: SAMSUNG ELECTRONICS CO., LTD, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/405,710

(22) Filed: Jan. 13, 2017

(65) Prior Publication Data

US 2017/0214785 A1    Jul. 27, 2017

(30) Foreign Application Priority Data

Jan. 21, 2016  (KR) ........................ 10-2016-0007831

(51) Int. Cl.
*H04M 1/725* (2006.01)
*H04W 12/06* (2009.01)
*H04W 4/80* (2018.01)
*H04L 29/06* (2006.01)

(52) U.S. Cl.
CPC ........ *H04M 1/72533* (2013.01); *H04L 63/08* (2013.01); *H04L 63/20* (2013.01); *H04W 4/80* (2018.02); *H04W 12/06* (2013.01); *H04M 1/7253* (2013.01); *H04M 1/72563* (2013.01); *H04M 2250/04* (2013.01)

(58) Field of Classification Search
CPC .......................... H04W 4/008; H04M 1/72533
USPC ................................ 455/418–420, 41.1–41.3
See application file for complete search history.

(56) References Cited

U.S. PATENT DOCUMENTS

| | | |
|---|---|---|
| 7,257,398 B1* | 8/2007 | Ukita .................. H04M 1/6066 348/14.05 |
| 2006/0148518 A1* | 7/2006 | Ferris ..................... G08C 17/02 455/553.1 |
| 2009/0239587 A1* | 9/2009 | Negron ............... G06F 3/04883 455/566 |

(Continued)

FOREIGN PATENT DOCUMENTS

| | | |
|---|---|---|
| KR | 10-2008-0096239 | 10/2008 |
| KR | 10-2013-0063604 | 6/2013 |

*Primary Examiner* — Jaime M Holliday
(74) *Attorney, Agent, or Firm* — Nixon & Vanderhye, P.C.

(57) ABSTRACT

The present disclosure relates to electronic devices and methods for controlling the same. According to an example embodiment of the present disclosure, an electronic device comprises a short-range communication module comprising short-range communication circuitry configured to perform short-range communication, a memory storing configuration information regarding at least one controlled object, the configuration information configured by the electronic device, and a processor electrically connected with the memory, wherein the processor is configured to enable the electronic device to send the configuration information to a second electronic device wherein the at least one controlled object is controllable by the second electronic device based on a data exchange through the short-range communication with the second electronic device.

9 Claims, 9 Drawing Sheets

(56) References Cited

U.S. PATENT DOCUMENTS

| | | | |
|---|---|---|---|
| 2010/0176915 A1* | 7/2010 | Hayes | G08C 17/02 340/5.2 |
| 2013/0149999 A1 | 6/2013 | Lee | |
| 2013/0171981 A1* | 7/2013 | Woo | G08C 17/02 455/420 |
| 2013/0205330 A1 | 8/2013 | Sinha et al. | |
| 2014/0277805 A1* | 9/2014 | Browne, Jr. | H04W 4/005 700/295 |
| 2015/0017913 A1 | 1/2015 | Kuroyama et al. | |

* cited by examiner

ELECTRONIC DEVICE AND METHOD FOR CONTROLLING THE SAME

CROSS-REFERENCE TO RELATED APPLICATION

This application is based on and claims priority under 35 U.S.C. § 119 to a Korean patent application filed in the Korean Intellectual Property Office on Jan. 21, 2016 and assigned Serial No. 10-2016-0007831, the disclosure of which is incorporated by reference herein in its entirety.

TECHNICAL FIELD

The present disclosure relates generally to electronic devices and methods for controlling the same.

DISCUSSION OF RELATED ART

Communication between things nowadays expand its concept from machine-to-machine (M2M), which enables intelligent communication between a human being and a thing using a mobile communication network, to the Internet, rapidly evolving to enable mutual interworking with all the information in a virtual and real-life world as well as things. In other words, M2M, enabling real-time, intelligent communication between a human being and a thing or between things anytime, anywhere in a convenient manner, is expanding its realm to the Internet of Things (IoT) while connecting all ambient things via the Internet.

The IoT refers, for example, to technology in which various things are equipped with sensors and communication functions to connect to the Internet. Here, the term "things" may refer to various embedded systems (computing systems of electronic devices such as smartphones), e.g., home appliances, mobile devices, or wearable computers. IoT-connected things may connect to the Internet using their own unique IP addresses for distinguishing them from others and may have sensors for obtaining information from an external environment.

Such devices comprising an IoT network may be classified into small things, whose hardware is implemented in a smaller size, such as lights or temperature controllers, display-free big things, such as washers, air conditioners, or robot cleaners, and display-equipped big things, such as smart TVs, smart refrigerators, digital cameras, smartphones, or wearable devices.

Such IoT technology enables the user to turn on or off various nearby electronic devices using a smartphone, adjust an air conditioner or temperature controller into a target temperature, change TV channels he or she is watching, or power on or off lights.

Conventional IoT techniques adopt a group operation function in which a gateway in a home network stores a group operation scenario, and when obtaining a group operation executing command, controls an electronic device in the network according to the group operation scenario. In other words, a gateway in a network is tightly coupled with a group operation function.

However, the conventional group operation function is tightly coupled with the gateway in the network. Accordingly, the user cannot use a group operation command, which used to be performed in a first network, in a second network.

Recently, various services are offered from social network services (SNSs) or websites through the display of an IoT-applied electronic device (e.g., a smart TV or smart refrigerator). Such an SNS or particular website may provide an update or various functions to a user only when permitted to do so through an authentication procedure on the user.

However, such a user authentication procedure is time-consuming and significantly uncomfortable for smart TVs which are controlled generally by a remote controller.

SUMMARY

Various example embodiments of the present disclosure address the foregoing or other issues and provide an electronic device and method for controlling the same, in which configuration information about at least one controlled object configured by the electronic device is transmitted to a second electronic device in a convenient manner so that the at least one controlled object may be controlled using the second electronic device.

According to an example embodiment of the present disclosure, an electronic device comprises a short-range communication module comprising short-range communication circuitry configured to perform short-range communication, a memory storing configuration information regarding at least one controlled object, the configuration information configured by the electronic device, and a processor electrically connected with the memory, wherein the processor is configured to enable the electronic device to send the configuration information to a second electronic device wherein the at least one controlled object is controllable by the second electronic device based on a data exchange through the short-range communication with the second electronic device.

According to an example embodiment of the present disclosure, a second electronic device communicating with an electronic device comprises a short-range communication module comprising short-range communication circuitry configured to perform short-range communication, a memory, and a processor electrically connected with the memory, wherein the processor is configured to control the short-range communication module through which the second electronic device receives, from the electronic device, configuration information regarding at least one controlled object configured by the electronic device based on a data exchange through short-range communication with the electronic device and to control the at least one controlled object corresponding to the received configuration information.

According to an example embodiment of the present disclosure, a method for controlling an electronic device may comprise storing configuration information regarding at least one controlled object, the configuration information configured by the electronic device and enabling the electronic device to send the configuration information to a second electronic device wherein the at least one controlled object is controllable by the second electronic device based on a data exchange through the short-range communication with the second electronic device.

According to an example embodiment of the present disclosure, a method for controlling a second electronic device communicating with an electronic device may comprise receiving configuration information regarding at least one controlled object configured by the electronic device based on a data exchange through short-range communication with the electronic device and controlling the at least one controlled object corresponding to the received configuration information.

According to various example embodiments of the present disclosure, there are an electronic device and method for controlling the same, in which configuration information about at least one controlled object configured by the electronic device is transmitted to a second electronic device in a convenient manner so that the at least one controlled object may be controlled using the second electronic device. Therefore, the user may perform the control on the controlled object, which used to be performed by the electronic device, by the second electronic device.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS to the above and other aspects, features and attendant advantages of the present disclosure will become more readily apparent and appreciated from the following detailed description, taken in conjunction with the accompanying drawings, in which like reference numerals refer to like elements, and wherein.

DETAILED DESCRIPTION

Figure 1:
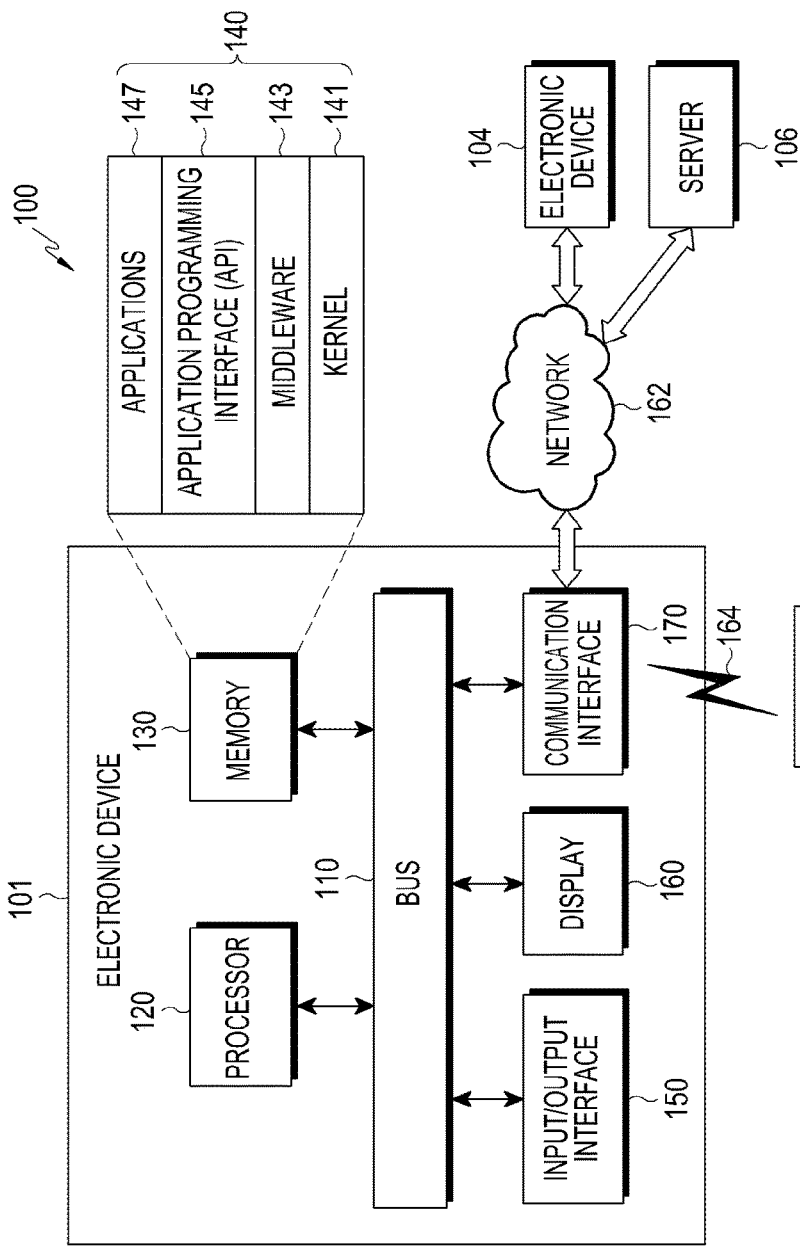
FIG. 1 is a block diagram illustrating an example electronic device in a network environment according to an example embodiment of the present disclosure.

Hereinafter, various example embodiments of the present disclosure are described with reference to the accompanying drawings. However, it should be appreciated that the present disclosure is not limited to the example embodiments, and all changes and/or equivalents or replacements thereto also belong to the scope of the present disclosure. The same or similar reference denotations may be used to refer to the same or similar elements throughout the description and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. On the other hand, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially refer to "specifically designed in hardware to." Rather, the term "configured to" may refer to a situation in which a device can perform an operation together with another device or parts. For example, the term "processor configured (or set) to perform A, B, and C" may refer, for example, to a generic-purpose processor (e.g., a CPU or application processor) that may perform the operations by executing one or more software programs stored in a memory device or a dedicated processor (e.g., an embedded processor) for performing the operations.

The terms as used herein are provided merely to describe various example embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a mobile medical device, a camera, or a wearable device, or the like, but is not limited thereto. According to an embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit), or the like, but is not limited thereto.

According to an embodiment of the present disclosure, the electronic device may be a home appliance. Examples of the home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™ PlayStation™), an electronic dictionary, an electronic key, a camcorder, or an electronic picture frame, or the like, but is not limited thereto.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or internet of things (IoT) devices (e.g., a bulb, various sensors, an electric or gas meter, a sprinkler, a fire alarm, a thermostat, a street light, a toaster, fitness equipment, a hot water tank, a heater, or a boiler), or the like, but is not limited thereto.

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves), or the like, but is not limited thereto. According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1 is a block diagram illustrating an example electronic device 101 in a network environment 100 according to an example embodiment of the present disclosure.

Referring to FIG. 1, the electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. In some embodiments, the electronic device 101 may exclude at least one of the components or may add another component.

The bus 110 may include a circuit for connecting the components with one another and transferring communications (e.g., control messages and/or data) between the components.

The processing module 120 may include various processing circuitry, such as, for example, and without limitation, one or more of a dedicated processor, a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may include various input/output circuitry configured to serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display, or the like, but is not limited thereto. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may include various communication circuitry configured to set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

The wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. Further, the wireless communication may include, e.g., short-range communication 164. The short-range communication 164 may include at least one of, e.g., wireless fidelity (Wi-Fi), bluetooth, near-field communication (NFC), or global navigation satellite system (GNSS). The GNSS may include at least one of, e.g., global positioning system (GPS), global navigation satellite system (Glonass), Beidou navigation satellite system (hereinafter, "Beidou") or Galileo, or the European global satellite-based navigation system.

Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
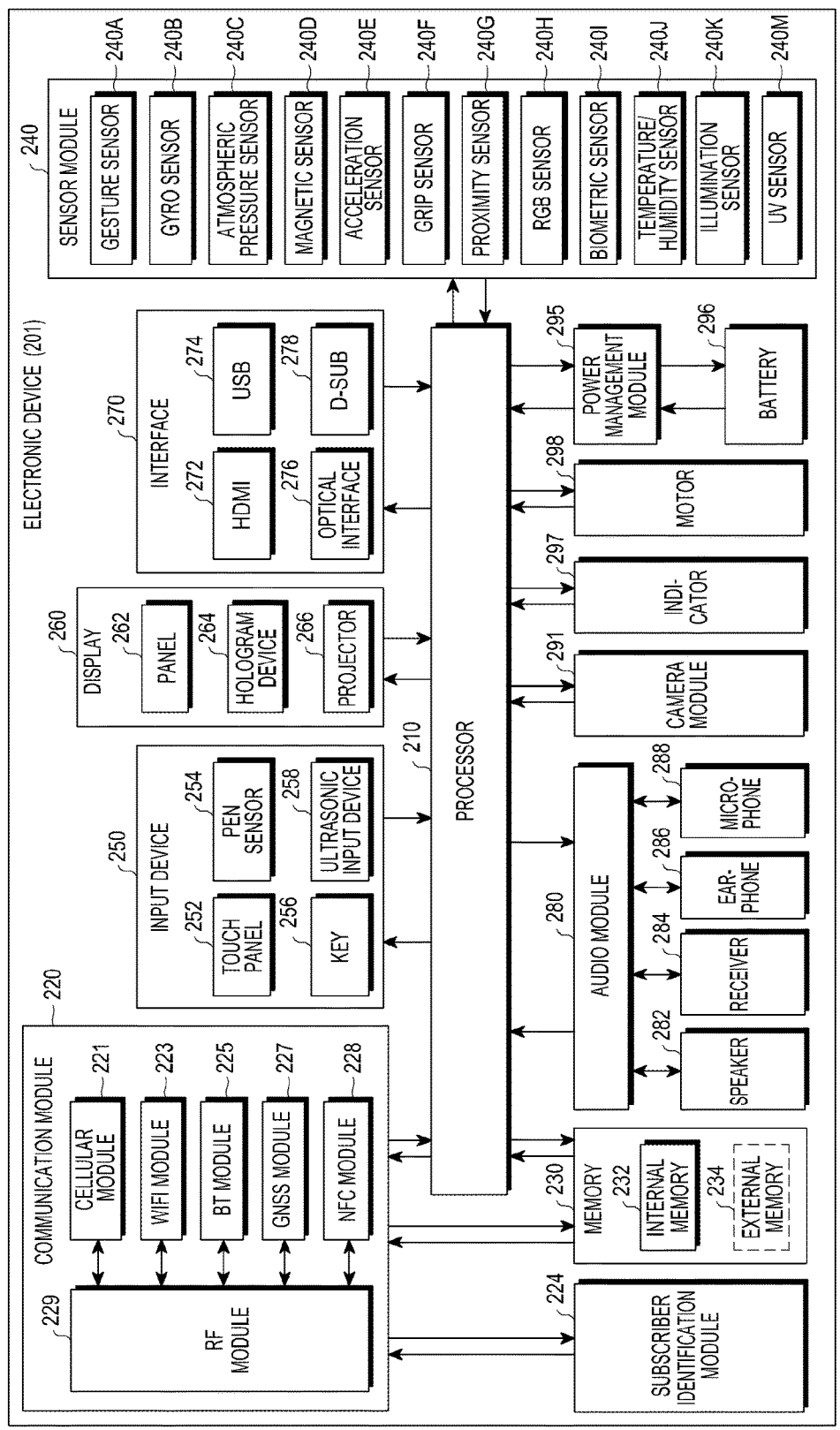
FIG. 2 is a block diagram illustrating an example electronic device according to an example embodiment of the present disclosure.

FIG. 2 is a block diagram illustrating an example electronic device according to an example embodiment of the present disclosure.

The electronic device 201 may include the whole or part of the configuration of, e.g., the electronic device 101 shown in FIG. 1. The electronic device 201 may include one or more processors (e.g., application processors (APs)) (e.g., including processing circuitry) 210, a communication module (e.g., including communication circuitry) 220, a subscriber identification module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry configured to control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store various data in the non-volatile memory.

The communication module 220 may have the same or similar configuration to the communication interface 170 of FIG. 1. The communication module 220 may include various communication circuitry, such as, for example, and without limitation, a cellular module 221, a wireless fidelity (Wi-Fi) module 223, a bluetooth (BT) module 225, a GNSS module 227, a NFC module 228, and a RF module 229.

The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP).

The Wi-Fi module 223, the Bluetooth (BT) module 225, the GNSS module 227, or the NFC module 228 may include a process for, e.g., processing data communicated through the module. At least some (e.g., two or more) of the cellular module 221, the Wi-Fi module 223, the Bluetooth module 225, the GNSS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the Bluetooth module 225, the GNSS module 227, or the NFC module 228 may communicate RF signals through a separate RF module.

The subscription identification module 224 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 and/or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a min-SD memory, an extreme digital (xD) memory, or a memory stick™. The external memory 234 may be functionally and/or physically connected with the electronic device 201 via various interfaces.

For example, the sensor module 240 may measure a physical quantity or detect an motion state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a biometric sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of an AP 210 or separately from the AP 210, and the electronic device 931 may control the sensor module 240 while the AP is in a sleep mode.

The input unit 250 may include, various input circuitry, such as, for example, and without limitation, a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or keypad. The ultrasonic input device 258 may use an input tool that generates an ultrasonic signal and enable the electronic device 201 to identify data by sensing the ultrasonic signal to a microphone (e.g., a microphone 288).

The display 260 (e.g., the display 160) may include a panel 262, a hologram device 264, or a projector 266. The panel 262 may have the same or similar configuration to the display 160 of FIG. 1. The panel 262 may be implemented to be flexible, transparent, or wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be, for example, located inside or outside of the electronic device 201. In accordance with an embodiment, the display 260 may further include a control circuit to control the panel 262, the hologram device 264, or the projector 266.

The interface 270 may include various interface circuitry, such as, for example, and without limitation, a high definition multimedia interface (HDMI) 272, a USB 274, an optical interface 276, or a D-subminiature (D-sub) 278. The interface 270 may be included in e.g., the communication interface 170 shown in FIG. 1. Additionally, or alternatively, the interface 270 may include a mobile high-definition link (MI-IL) interface, a secure digital (SD) card/multimedia card (MMC) interface, or infrared data association (IrDA) standard interface.

The audio module 280 may convert a sound into an electric signal or vice versa, for example. At least a part of the audio module 280 may be included in e.g., the input/output interface 150 as shown in FIG. 1. The audio module 280 may process sound information input or output through e.g., a speaker 282, a receiver 284, an earphone 286, or a microphone 288.

For example, the camera module 291 may be a device for recording still images and videos, and may include, according to an embodiment of the present disclosure, one or more image sensors (e.g., front and back sensors), a lens, an Image signal processor (ISP), or a flash such as an LED or xenon lamp.

The power manager module 295 may manage power of the electronic device 201, for example. According to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 3:
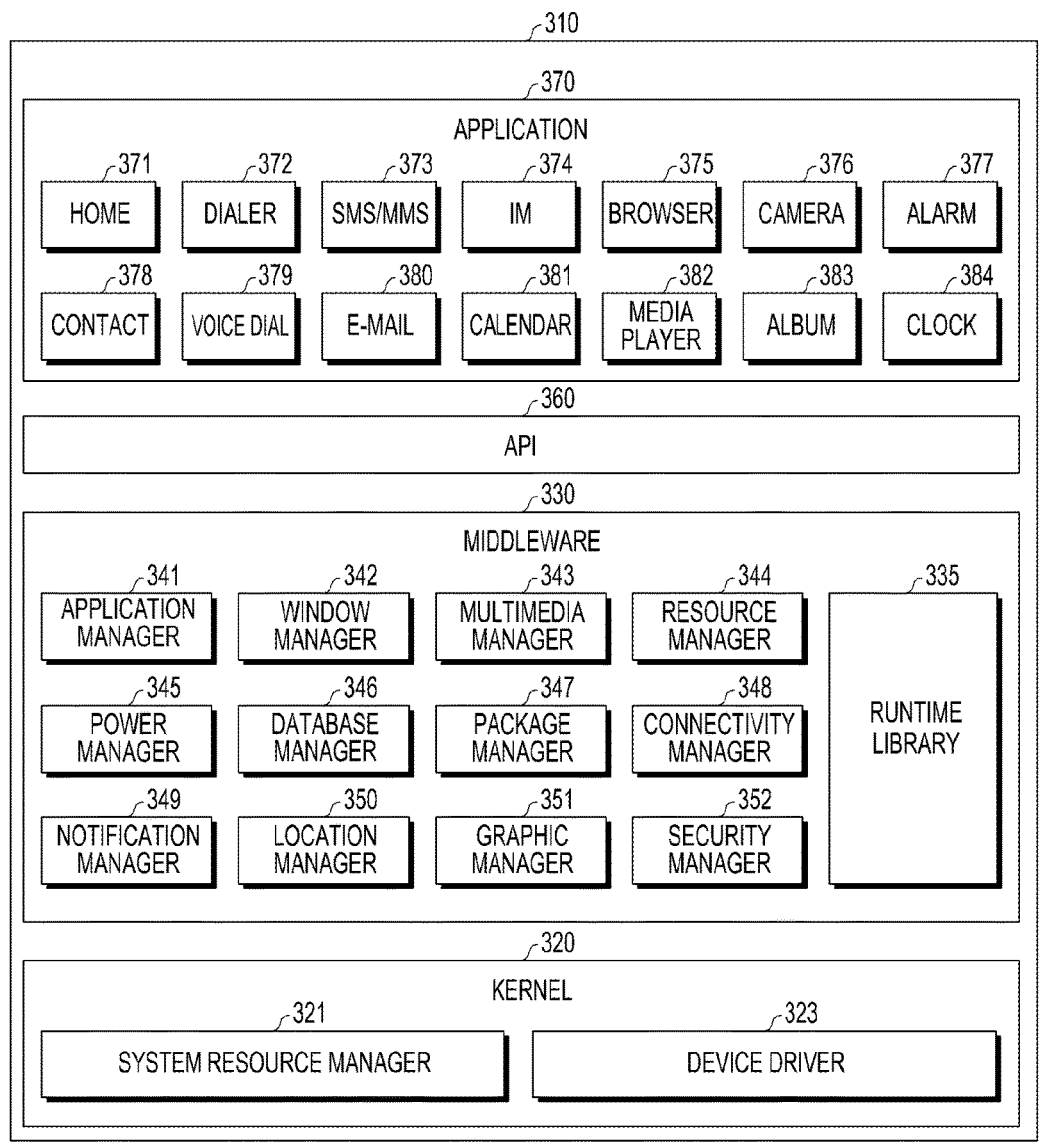
FIG. 3 is a block diagram illustrating an example program module according to an example embodiment of the present disclosure.

FIG. 3 is a block diagram illustrating an example program module according to an example embodiment of the present disclosure.

According to an embodiment of the present disclosure, the program module 310 (e.g., the program 140) may include an operating system (OS) controlling resources related to the electronic device (e.g., the electronic device 101) and/or various applications (e.g., the application processor 147) driven on the operating system. The operating system may include, e.g., Android, iOS, Windows, Symbian, Tizen, or Bada.

The program 310 may include, e.g., a kernel 320, middleware 330, an application programming interface (API) 360, and/or an application 370. At least a part of the program module 310 may be preloaded on the electronic device or may be downloaded from an external electronic device (e.g., the electronic devices 102 and 104) or a server (e.g., the server 106).

The kernel 320 (e.g., the kernel 141 of FIG. 1) may include, e.g., a system resource manager 321 or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage GUI resources used on the screen. The multimedia manager 343 may grasp formats necessary to play various media files and use a codec appropriate for a format to perform encoding or decoding on media files. The resource manager 344 may manage resources, such as source code of at least one of the applications 370, memory or storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or Bluetooth. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related user interface. The security manager 352 may provide various security functions necessary for system security or user authentication. According to an embodiment of the present disclosure, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may provided a specified module per type of the operating system in order to provide a differentiated function. Further, the middleware 330 may dynamically omit some existing components or add new components.

The API 360 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 370 (e.g., the application processor 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a heath-care (e.g., measuring the degree of workout or blood sugar), or provision of environmental information (e.g., provision of air pressure, moisture, or temperature information).

According to an embodiment of the present disclosure, the application 370 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 370 may include an application (e.g., a health-care application of a mobile medical device) designated according to an attribute of the external electronic device (e.g., the electronic devices 102 and 104). According to an embodiment of the present disclosure, the application 370 may include an application received from the external electronic device (e.g., the server 106 or electronic devices 102 and 104). According to an embodiment of the present disclosure, the application 370 may include a preloaded application or a third party application downloadable from a server. The names of the components of the program module 310 according to the shown embodiment may be varied depending on the type of operating system.

According to an embodiment of the present disclosure, at least a part of the program module 310 may be implemented in software, firmware, hardware, or in a combination of two or more thereof. At least a part of the programming module 310 may be implemented (e.g., executed) by e.g., a processor (e.g., the processor 120). At least a part of the program module 310 may include e.g., a module, program, routine, set of instructions, process, or the like for performing one or more functions.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically.

For example, the module may include at least one of a dedicated processor, a CPU, Application Specific Integrated Circuit (ASIC) chips, Field Programmable Gate Arrays (FPGAs), or Programmable Logic Arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out example embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s). The embodiments disclosed herein are proposed for description and understanding of the disclosed technology and does not limit the scope of the present disclosure. Accordingly, the scope of the present disclosure should be interpreted as including all changes or various embodiments based on the technical spirit of the present disclosure.

Figure 4A:
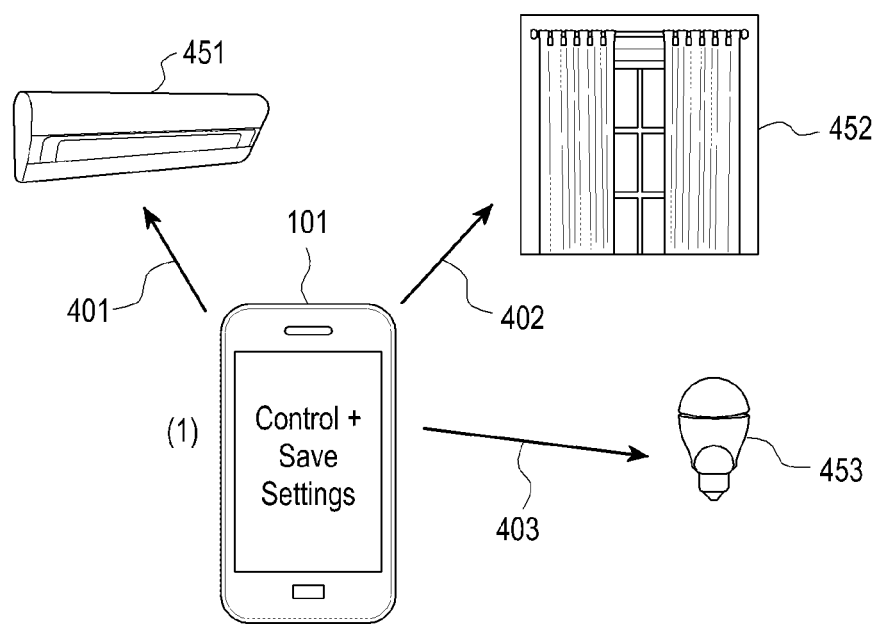
FIGS. 4A and 4B are diagrams illustrating an example system for a control operation of an electronic device according to an example embodiment of the present disclosure.
Figure 4B:
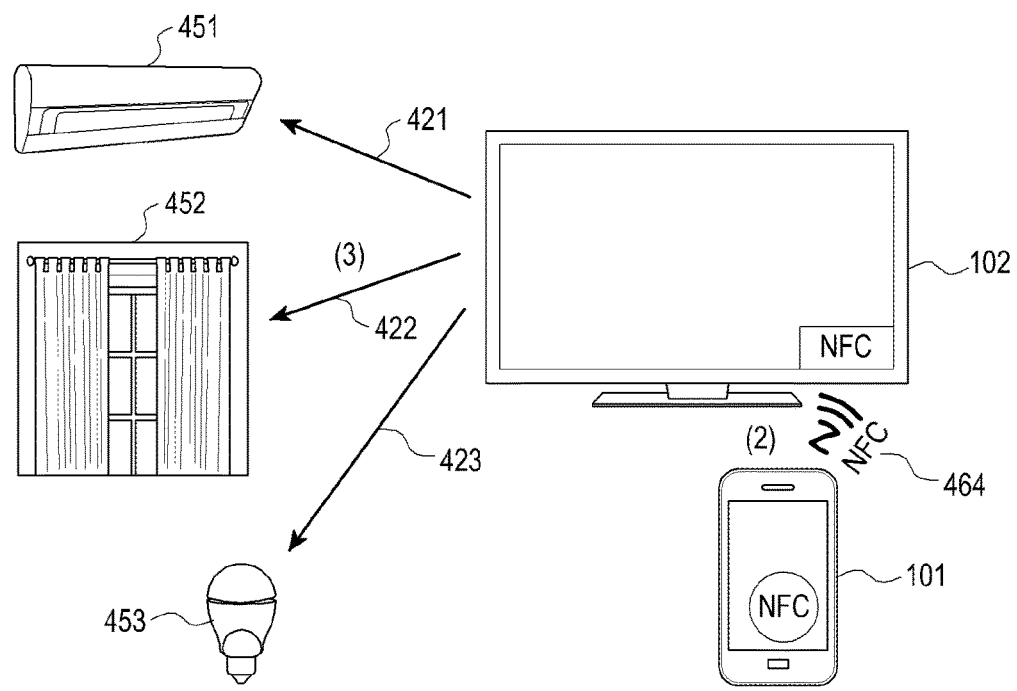

FIGS. 4A and 4B are diagrams illustrating an example system for a control operation of an electronic device according to an example embodiment of the present disclosure.

As illustrated in FIG. 4A, the electronic device 101 may communicate with at least one controlled electronic device 451, 452, or 453. The electronic device 101 may communicate with the at least one controlled electronic device 451, 452, or 453 through a communication module (e.g., the communication module 220 of FIG. 2). The electronic device 101 may communicate with the at least one controlled electronic device 451, 452, or 453 by various communication schemes that are not particularly limited. Meanwhile, the electronic device 101 may communicate with the at least one controlled electronic device 451, 452, or 453 using a constrained application protocol (CoAP).

As illustrated in FIG. 4A, the electronic device 101 may transmit operation control information 401, 402, or 403 to the at least one controlled electronic device 451, 452, or 453 (1). Then, the at least one controlled electronic device 451, 452, or 453 may perform an operation corresponding to the operation control information 401, 402, or 403.

According to an embodiment of the present disclosure, the electronic device 101 may generate configuration information based on the operation control information 401, 402, or 403 for each of the at least one controlled electronic device 451, 452, or 453. Here, the configuration information may be information that may be classified as per operation functions of the at least one controlled electronic device 451, 452, or 453, and the configuration information may be shown as in Table 1 below, according to an embodiment of the present disclosure.

TABLE 1

| Configuration information | Type of electronic device to be controlled |
|---|---|
| Room heating/cooling device | Air conditioner, boiler, window open/close system |
| Lighting device | Fluorescent light, incandescent light, curtain open/close system, stand light |
| Media device | TV, audio, CD player, MP3 player, or radio |

As set forth in Table 1, the configuration information may have category information that may be classified as per operation functions of the electronic device. For example, the configuration information may include category information regarding a "room heating/cooling device" including various controlled electronic devices, such as an air conditioner, a boiler, or a window opening/closing system. Or, the configuration information may include category information regarding a "lighting device" including various controlled electronic devices, such as a fluorescent light, an incandescent light, a curtain opening/closing system, or a stand light. Or, the configuration information may include category information regarding a "media device" including various controlled electronic devices, such as a TV, an audio, a CD player, a MP3 player, or a radio.

In the embodiment shown in FIG. 4a, the electronic device 101 may store operation control information as set forth in Table 2, for example.

TABLE 2

| Configuration information | Operation control information |
|---|---|
| Room heating/cooling device | Adjust to 18° C./open window |
| Lighting device | Turn on |

As set forth above in Table 2, the configuration information may include operation control information per category according to an embodiment of the present disclosure.

As illustrated in FIG. 4B, the electronic device 101 may communicate with a second electronic device 102. The electronic device 101 and the second electronic device 102 each may include a short-range communication module (e.g., the NFC module 228 in the communication module 220 of FIG. 2). For example, the short-range communication module may be a contactless short-range network module providing a transmission speed of 42 Kbps at a frequency band of 13.56 MHzn and may provide a near-field communication (NFC) data exchange function 464 between the electronic device 101 and the second electronic device 102 (e.g., peer-to-peer communication between the electronic devices). NFC may be appreciated as an expansion of radio frequency identification (RFID) and may provide not only functions as a tag as does RFID but also functions as a reader and writer of a tag.

According to an embodiment of the present disclosure, the electronic device 101 may send the configuration information to the second electronic device 102 while the electronic device 101 and the second electronic device 102 perform short-range communication (NFC) data exchange 464 so that the second electronic device 102 may control the at least one controlled electronic device 451, 452, or 453 (2).

The second electronic device 102 may control the at least one controlled electronic device 451, 452, or 453 corresponding to the configuration information received from the electronic device 101 while performing the short-range communication data exchange. The second electronic device 102 may send operation control information 421, 422, or 423 for each of the at least one controlled electronic device 451, 452, or 453 included in the received configuration information. Then, the at least one controlled electronic device 451, 452, or 453 may perform an operation corresponding to the operation control information 421, 422, or 423 (3).

According to an embodiment of the present disclosure, when second short-range communication data exchange with the second electronic device 102 is performed after the first short-range communication data exchange with the second electronic device 102 is complete, the electronic device 101 may enable the configuration information to be initialized in the second electronic device 102 during the second short-range communication data exchange. Then, the second electronic device 102 may stop the control of the at least one controlled electronic device 451, 452, or 453. According to an embodiment of the present disclosure, the second electronic device 102 may control the controlled electronic device 451, 452, or 453 in a state before receiving the configuration information from the electronic device 101 or terminate the operation of the controlled electronic device 451, 452, or 453.

Figure 5:
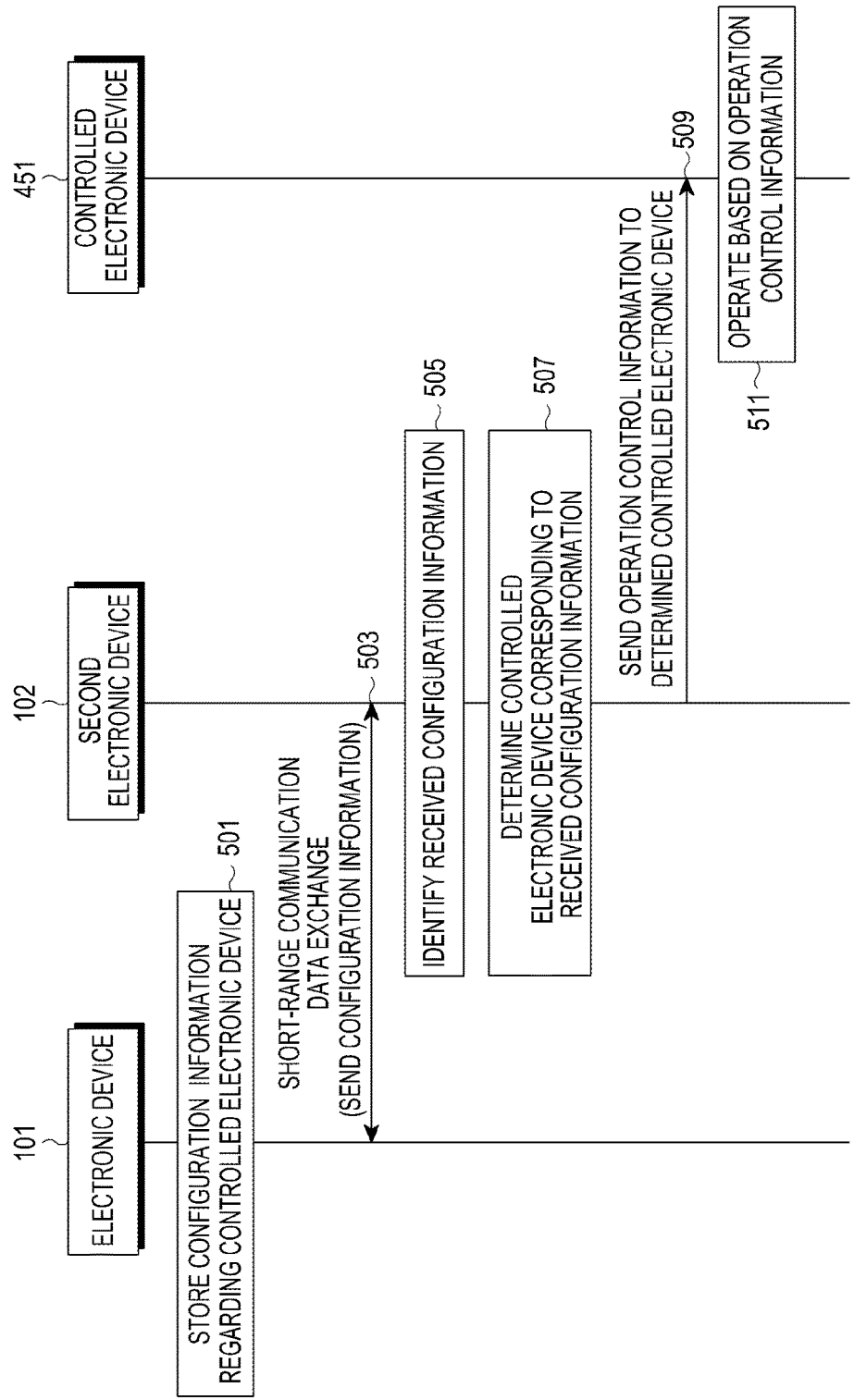
FIG. 5 is a flowchart illustrating an example control operation of an electronic device according to an example embodiment of the present disclosure.

FIG. 5 is a flowchart illustrating an example control operation of an electronic device according to an example embodiment of the present disclosure.

Now described with reference to FIG. 5 are operations for controlling an electronic device according to an embodiment of the present disclosure. As in the embodiment illustrated in FIG. 5, the electronic device 101 may also send configuration information including operation control information of a single controlled electronic device, according to an embodiment of the present disclosure. According to an embodiment of the present disclosure, the configuration information may include operation control information regarding a plurality of controlled electronic devices or operation control information regarding a single controlled electronic device.

In operation 501, the electronic device 101 may generate and store configuration information based on the operation control information regarding at least one controlled electronic device 451. Here, the configuration information may be information that may be categorized as per operation functions of at least one controlled electronic device and may include category information that may be classified as per operation functions of the at least one controlled electronic device. Further, the configuration information may include operation control information per category of the at least one controlled electronic device.

In operation 503, the electronic device 101 may send the configuration information to the second electronic device 102 while performing a short-range communication (NFC) data exchange with the second electronic device 102 so that the second electronic device 102 may control the at least one controlled electronic device 451.

In operation 505, the second electronic device 102 may identify the configuration information received from the electronic device 101 during the short-range communication data exchange. For example, the second electronic device 102 may identify that the category information in the configuration information is regarding a "room heating/cooling device."

In operation 507, the second electronic device 102 may determine a controlled electronic device corresponding to the received configuration information. For example, the second electronic device 102 may inquire all of the controlled electronic devices in the network about the category information and may receive a response thereto to determine the controlled electronic device corresponding to the configuration information. Or, the second electronic device 102 may previously gather and store category information regarding all of the controlled electronic devices in the network and determine the controlled electronic device corresponding to the configuration information using the category information.

In operation 509, the second electronic device 102 may send the operation control information included in the configuration information to the determined controlled electronic device.

In operation 511, the controlled electronic device 451 may perform an operation as per the received operation control information. For example, the controlled electronic device 451 may control a temperature adjusting function of the controlled electronic device 451 based on the operation control information "adjust to 18° C." in the configuration information.

According to an embodiment of the present disclosure, the electronic device 101 may run at least one controlled application. The electronic device 101 may receive the controlled application from an external server (e.g., the server 106 of FIG. 1) through a communication module (e.g., the communication module 220 of FIG. 2). For example, the electronic device 101 may run a web browser application to access an email, SNS, or shopping website. Or, the electronic device 101 may run a separate application providing a particular service to access an email, SNS, or shopping website. The electronic device 101 may perform an authentication process in the course of receiving the web service through the controlled application.

The electronic device 101 may generate configuration information based on the authentication process performed through the at least one controlled application. Here, the configuration information may be information that may be classified as per authentication process schemes of the at least one controlled application performed by the electronic device 101, and authentication process information for each controlled application may be stored. According to an embodiment of the present disclosure, the configuration information may be shown in Table 3 below.

TABLE 3

| Attribute information | Authentication process information |
|---|---|
| Website 1 | Password |
| Website 2 | Password |
| SNS1 | Email address/password |
| SNS2 | Email address/password |
| Financial website | Authenticated certificate/password/PIN |

As shown in Table 3, the configuration information may include authentication process information per controlled application, according to an embodiment of the present disclosure.

Figure 6A:
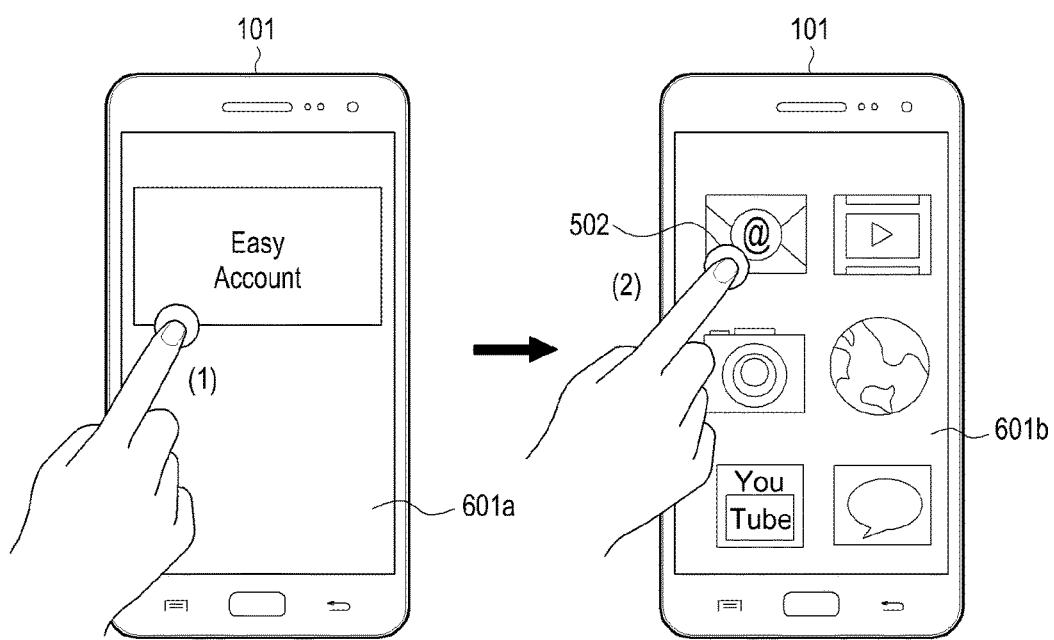
FIGS. 6A and 6B are diagrams illustrating an example system for a control operation of an electronic device according to an example embodiment of the present disclosure.
Figure 6B:
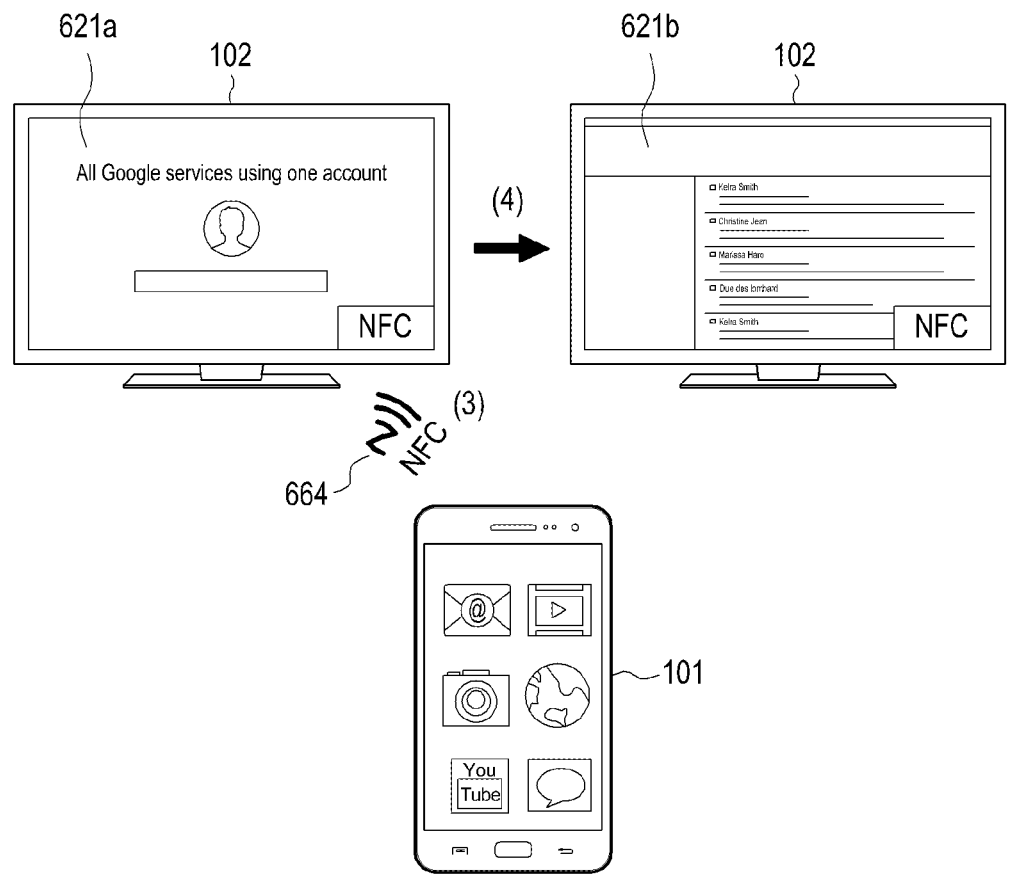

FIGS. 6A and 6B are diagrams illustrating an example system for a control operation of an electronic device according to an example embodiment of the present disclosure.

As illustrated in FIG. 6A, the electronic device 101 may run an application 601a that enables configuration information including authentication process information regarding at least one controlled application to the second electronic device 102 (1) and may provide a selection list 601b for each controlled application according to the running of the application 601a. Then, the user may select a particular controlled application from the selection list (2).

As illustrated in FIG. 6B, the electronic device 101 may communicate with a second electronic device 102. The electronic device 101 and the second electronic device 102 each may include a short-range communication module (e.g., the NFC module 228 in the communication module 220 of FIG. 2). For example, the short-range communication module may be a contactless short-range network module providing a transmission speed of 42 Kbps at a frequency band of 13.56 MHzn and may provide a near-field communication (NFC) data exchange function 664 between the electronic device 101 and the second electronic device 102 (e.g., peer-to-peer communication between the electronic devices). NFC may be appreciated as an expansion of radio frequency identification (RFID) and may provide not only functions as a tag as does RFID but also functions as a reader and writer of a tag.

According to an embodiment of the present disclosure, the electronic device 101 may send the configuration information to the second electronic device 102 to perform an authentication process on an application 621a that runs on the second electronic device 102 and waits for an authentication process while performing a short-range communication (NFC) data exchange with the second electronic device 102 (3).

The second electronic device 102 may perform an authentication process on the waiting a 621a corresponding to the authentication process information included in the configuration information received from the electronic device 101 during the short-range communication data exchange and may provide the authentication-processed application 621b (4).

According to an embodiment of the present disclosure, when second short-range communication data exchange with the second electronic device 102 is performed after the first short-range communication data exchange with the second electronic device 102 is complete, the electronic device 101 may enable the configuration information to be initialized in the second electronic device 102 during the second short-range communication data exchange. Then, the second electronic device 102 may log out the authentication-processed application 621b.

Figure 7:
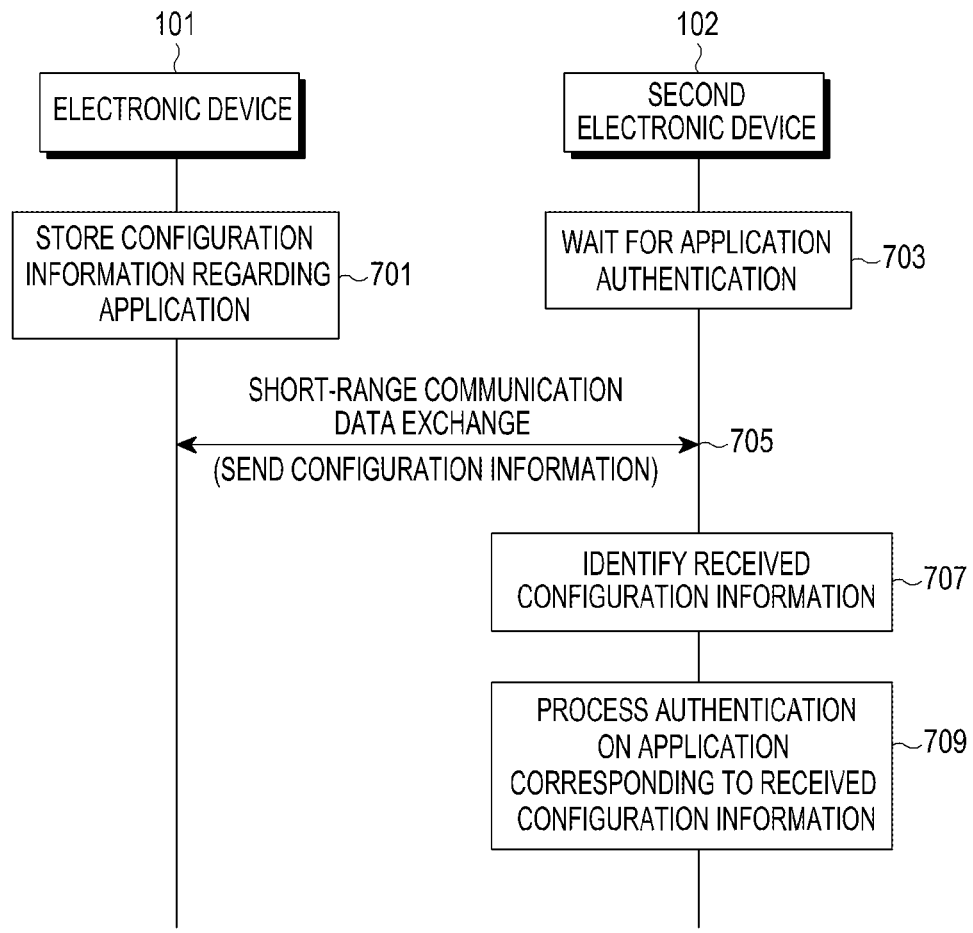
FIG. 7 is a flowchart illustrating an example control operation of an electronic device according to an example embodiment of the present disclosure.

FIG. 7 is a flowchart illustrating an example control operation of an electronic device according to an example embodiment of the present disclosure.

Now described with reference to FIG. 7 are operations for controlling an electronic device according to an embodiment of the present disclosure. As in the embodiment illustrated in FIG. 7, the electronic device 101 may also send configuration information including authentication process information of a single controlled electronic device, according to an embodiment of the present disclosure. According to an embodiment of the present disclosure, the configuration information may include authentication process information regarding a plurality of controlled applications or authentication process information regarding a single controlled application.

In operation 701, the electronic device 101 may generate and store configuration information based on an authentication process for at least one controlled application. Here, the configuration information may be information that may be classified as per authentication process schemes of the at least one controlled application performed by the electronic device 101, and authentication process information for each controlled application may be stored.

In operation 703, the second electronic device 102 may run at least one controlled application and wait for an authentication process on the running controlled application.

Meanwhile, the electronic device 101 may identify the application waiting for authentication in the second electronic device 102 in operation 701. A controlled application that may correspond to the identified application may be selected by the user.

In operation 705, the electronic device 101 may send the configuration information to the second electronic device 102 to perform an authentication process on the application that runs on the second electronic device 102 and waits for an authentication process while performing a short-range communication (NFC) data exchange with the second electronic device 102.

In operation 707, the second electronic device 102 may identify the configuration information received from the electronic device 101 during the short-range communication data exchange. For example, the second electronic device 102 may identify whether the authentication process information in the configuration information corresponds to the application currently running on the second electronic device 102.

In operation 709, the second electronic device 102 may perform an authentication process on the application that runs on the second electronic device 102 and waits for an authentication process using the authentication process information contained in the received configuration information.

The embodiments herein are provided merely for better understanding of the present disclosure, and the present disclosure should not be limited thereto or thereby. It will be understood and appreciated by one of ordinary skill in the art that various changes in form or detail may be made to the various example embodiments without departing from the scope of the present disclosure defined by the following claims.

What is claimed is:

1. An electronic device, comprising:
   communication circuitry configured to provide a near-field communication (NFC);
   a memory; and
   a processor electrically connected with the memory, wherein the processor is configured to:
   store configuration information regarding at least one controlled object in the memory, the configuration information configured by the electronic device, wherein the at least one controlled object includes at least one controlled application, and wherein the configuration information includes authentication process information regarding the at least one controlled application configured by the electronic device;
   identify an input to control a first application among the at least one controlled application, the first application being executed in a second electronic device; and
   send first configuration information including first authentication process information regarding the first application configured by the electronic device to the second electronic device to authenticate for the first application being executed in the second electronic device based on a first NFC data exchange through the communication circuitry during a first contact between the electronic device and the second electronic device,
   wherein the first application is authenticated by the second electronic device using the first configuration information based on the first NFC data exchange, and
   wherein, after the first NFC data exchange is completed, when a second NFC data exchange is performed through the communication circuitry during a second contact between the electronic device and the second electronic device, the processor is configured to enable the first configuration information to be initialized in the second electronic device such that the second electronic device is not allowed to use the first configuration information for authenticating of the first application, based on the second NFC data exchange.

2. The electronic device of claim 1, wherein the processor is configured to:
   perform an authentication process regarding the at least one controlled application, and generate the configuration information based on the performed authentication process regarding the at least one controlled application.

3. The electronic device of claim 1, wherein the configuration information is classified based on an authentication process scheme for the at least one controlled application.

4. A second electronic device configured to communicate with an electronic device, comprising:
   communication circuitry configured to provide a near-field communication (NFC);
   a memory; and
   a processor electrically connected with the memory, wherein the processor is configured to:
   control the communication circuitry through which the second electronic device receives, from the electronic device, configuration information regarding at least one controlled object configured by the electronic device based on a first NFC data exchange through the communication circuitry during a first contact between the second electronic device and the electronic device, wherein the at least one controlled object includes at least one controlled application, and wherein the configuration information includes authentication process information regarding the at least one controlled application configured by the electronic device; and
   authenticate a first application being executed in the second electronic device among the at least one controlled application using the received first configuration information including first authentication process information regarding the first application configured by the electronic device, based on the first NFC data exchange,
   wherein after the first NFC data exchange is completed, when a second NFC data exchange is performed through the communication circuitry during a second contact between the second electronic device and the electronic device, the processor is configured to initialize the first configuration information such that the second electronic device is not allowed to use the first configuration information for authenticating of the first application based on the second NFC data exchange.

5. The second electronic device of claim 4, wherein the configuration information is classified based on an authentication process scheme for the at least one controlled application.

6. A method for controlling an electronic device, the method comprising:
   storing configuration information regarding at least one controlled object, the configuration information configured by the electronic device, wherein the at least one controlled object includes at least one controlled application, and wherein the configuration information includes authentication process information regarding the at least one controlled application configured by the electronic device;
   identifying an input to control a first application among the at least one controlled application, the first application being executed in a second electronic device; and
   sending first configuration information including first authentication process information regarding the first application configured by the electronic device to the second electronic device to authenticate for the first application being executed in the second electronic device based on a first NFC data exchange through a first NFC during a first contact between the electronic device and the second electronic device,
   wherein the first application is authenticated by the second electronic device using the first configuration information based on the first NFC data exchange, and
   wherein the method further comprises, after the first NFC data exchange is completed, when a second NFC data exchange is performed through a second NFC during a second contact between the electronic device and the second electronic device, enabling the first configuration information to be initialized in the second electronic device such that the second electronic device is not allowed to use the first configuration information for authenticating of the first application, based on the second NFC data exchange.

7. The method of claim 6, further comprising:
   performing an authentication process regarding the at least one controlled application; and generating the configuration information based on the performed authentication process regarding the at least one controlled application.

8. The method of claim 6, wherein the configuration information is classified based on an authentication process scheme for the at least one controlled application.

9. A method for controlling a second electronic device communicating with an electronic device, the method comprising:

receiving configuration information regarding at least one controlled object configured by the electronic device based on a first NFC data exchange through a first NFC during a first contact between the second electronic device and the electronic device, wherein the at least one controlled object includes at least one controlled application, and wherein the configuration information includes authentication process information regarding the at least one controlled application configured by the electronic device; and authenticating a first application being executed in the second electronic device among the at least one controlled application using the received first configuration information including first authentication process information regarding the first application configured by the electronic device, based on the first NFC data exchange, wherein the method further comprises, after the first NFC data exchange is completed, when a second NFC data exchange is performed through a second NFC during a second contact between the second electronic device and the electronic device, initializing the first configuration information such that the second electronic device is not allowed to use the first configuration information for authenticating of the first application, based on the second NFC data exchange.

* * * * *